US012599231B2

(12) United States Patent
Yang et al.

(10) Patent No.: US 12,599,231 B2
(45) Date of Patent: Apr. 14, 2026

(54) CONTROL METHOD FOR SMART FURNITURE

(71) Applicant: ZHEJIANG JIECANG LINEAR MOTION TECHNOLOGY CO., LTD., Shaoxing (CN)

(72) Inventors: Yang Yang, Shaoxing (CN); Yuchen Tan, Shaoxing (CN); Tao Sun, Shaoxing (CN); Qing Shi, Shaoxing (CN)

(73) Assignee: ZHEJIANG JIECANG LINEAR MOTION TECHNOLOGY CO., LTD., Shaoxing (CN)

( * ) Notice: Subject to any disclaimer, the term of this patent is extended or adjusted under 35 U.S.C. 154(b) by 259 days.

(21) Appl. No.: 18/698,901

(22) PCT Filed: Jan. 4, 2023

(86) PCT No.: PCT/CN2023/070397
§ 371 (c)(1),
(2) Date: Apr. 5, 2024

(87) PCT Pub. No.: WO2023/131176
PCT Pub. Date: Jul. 13, 2023

(65) Prior Publication Data
US 2025/0221526 A1    Jul. 10, 2025

(30) Foreign Application Priority Data
Jan. 5, 2022    (CN) .......................... 202210006668.1

(51) Int. Cl.
*E03C 1/04*      (2006.01)
*A47B 46/00*     (2006.01)
(Continued)

(52) U.S. Cl.
CPC .............. *A47B 88/80* (2017.01); *A47B 46/00* (2013.01); *A47B 77/06* (2013.01); *E05F 15/70* (2015.01);
(Continued)

(58) Field of Classification Search
CPC .......... E05F 15/70; E05F 15/73; G05B 15/02; E03C 1/04; E03C 1/0401; E03C 1/18;
(Continued)

(56) References Cited

U.S. PATENT DOCUMENTS 8,310,191 B2 * 11/2012 Schneider ............ A47B 88/453
312/319.1
2006/0054753 A1 * 3/2006 Lee ........................ A47C 4/286
248/164
(Continued)

FOREIGN PATENT DOCUMENTS

CN        106724143 A     5/2017
CN        206371705 U     8/2017
(Continued)

OTHER PUBLICATIONS

Mar. 17, 2023 International Search Report issued in International Patent Application No. PCT/CN2023/070397.
(Continued)

*Primary Examiner* — Gabriel Agared
(74) *Attorney, Agent, or Firm* — OLIFF PLC

(57)        ABSTRACT

A control method for smart furniture includes a furniture body, a movable part, and a concealing part, a cavity for receiving the movable part being disposed on the furniture body, the concealing part part's deployed position for concealing the cavity and retracted position for exposing the cavity being provided on the furniture body, a first drive device and a second drive device being provided in the furniture body, inside the furniture body being further pro-
(Continued)

vided a sensor, a controller, and a receiving box, the controller being connected to the sensor and the receiving box; the control method is to control movements of the movable part and the concealing part based on the control instruction. The control method may realize position shift between the concealing part and the movable part to satisfy user needs, without interference arising during the switching process.

10 Claims, 8 Drawing Sheets

(51) Int. Cl.

| | | |
|---|---|---|
| *A47B 77/06* | (2006.01) | |
| *A47B 88/80* | (2017.01) | |
| *E03C 1/18* | (2006.01) | |
| *E05F 15/70* | (2015.01) | |
| *G05B 15/02* | (2006.01) | |

(52) U.S. Cl.
CPC ........ *G05B 15/02* (2013.01); *E05Y 2900/212* (2013.01)

(58) Field of Classification Search
CPC .. E03C 1/186; E03C 1/057; E03C 2001/0417; A47B 77/04; A47B 88/80; A47B 88/457; A47B 46/00; A47B 77/06; A47B 81/064; A47B 51/00; Y02P 90/02; E05Y 2900/212
USPC ........................................................ 318/466
See application file for complete search history.

(56) References Cited

U.S. PATENT DOCUMENTS

| | | | | |
|---|---|---|---|---|
| 2006/0196297 A1* | 9/2006 | Schunke | .............. | A47C 20/041 |
| | | | | 74/469 |
| 2008/0122332 A1* | 5/2008 | Brustle | ................. | E05F 1/1058 |
| | | | | 312/319.2 |
| 2015/0035423 A1* | 2/2015 | Raunikar | .............. | A47B 88/40 |
| | | | | 312/333 |
| 2019/0304271 A1* | 10/2019 | Yu | .................... | G08B 13/19632 |
| 2020/0087908 A1* | 3/2020 | Chen | ....................... | E03C 1/057 |

FOREIGN PATENT DOCUMENTS

| | | |
|---|---|---|
| CN | 107625466 A | 1/2018 |
| CN | 109363356 A | 2/2019 |
| CN | 111998587 A | 11/2020 |
| CN | 112273899 A | 1/2021 |
| CN | 215125377 U | 12/2021 |
| JP | 2002-095534 A | 4/2002 |

OTHER PUBLICATIONS

Mar. 17, 2023 Written Opinion issued in International Patent Application No. PCT/CN2023/070397.
Dec. 18, 2024 Search Report issued in European Patent Application No. 23737039.0.

\* cited by examiner

CONTROL METHOD FOR SMART FURNITURE

FIELD

The disclosure relates to smart furniture, and more particularly relates to a control method for smart furniture.

BACKGROUND

Smart furniture may make life easier and enhance user experience due to its versatile features. A user of multipurpose furniture would frequently switch between two functions or switch to use one function thereof. For example, a kitchen island comprising a storage space, a sink, and a countertop. The user would prepare food and clean cooking utensils on the island. The countertop area of a small-sized island would not satisfy user needs, e.g., inconvenient for preparing food. The sink, which occupies much space of the countertop, would lay idle when cooking. If the sink is designed to be concealable, the usable area of the countertop would increase when the idle sink is concealed. However, movement interference between parts easily occurs in the way of function switching.

SUMMARY

A technical problem to be solved by the disclosure is a control method for smart furniture to overcome the drawbacks in conventional technologies.

To solve the technical problem, the disclosure adopts a technical solution below:

A control method for smart furniture, wherein the smart furniture comprises a furniture body, a movable part and a concealing part, the movable part and the concealing part being disposed on the furniture body; a cavity for receiving the movable part is provided on the furniture body; the concealing part's deployed position for concealing the cavity and retracted position for exposing the cavity are provided on the furniture body; inside the furniture body are provided a first drive device for switching the concealing part between the deployed position and the retracted position, and a second drive device for driving the movable part to extend out of or retract into the cavity; inside the furniture body are further provided a sensor for detecting positions of the movable part and the concealing part, a controller for controlling the first drive device and the second drive device, and a receiving box for receiving a control instruction; the controller is connected to the sensor to obtain position information of the movable part and the concealing part, and connected to the receiving box to analyze the control instruction; and the control method comprises: analyzing, by the controller, after the receiving box receives a control instruction directed to the movable part or the concealing part, the control instruction to estimate moving direction of the movable part or the concealing part; obtaining, by the sensor, current positions of the movable part and the concealing part, and estimating, by the controller, whether movement of the movable part or the concealing part is to be interfered with based on information from the sensor; and controlling, based on estimated direction and interference estimation in conjunction with the control instruction, drive direction and drive distance of the first drive device and/or the second drive device.

Based on the above solution, the estimating, by the controller, whether movement of the movable part or the concealing part is to be interfered with based on information from the sensor comprises: recording current position information of the movable part and the concealing part; obtaining, according to the control instruction, a moving trajectory of the movable part or the concealing part to a specified position; and estimating whether the movable part is in the moving trajectory of the concealing part or whether the concealing part is in the moving trajectory of the movable part.

Based on the above solution, the control instruction is driving the concealing part to move towards the deployed position or the retracted position or driving the movable part to move towards a direction of extending out of or retracting into the cavity, and the controlling drive direction and drive distance of the first drive device and/or the second drive device comprises: reading the current position information of the movable part and the concealing part; driving, by the first drive device or the second drive device, the concealing part or the movable part, and recording in real time current position information of the concealing part and the movable part; and deactivating the first drive device or the second drive device before occurrence of interference between the concealing part and the movable part or upon interruption of the control instruction.

Based on the above solution, in a case that the control instruction is driving the concealing part to the deployed position, the control method proceeds to step S10; and in a case that the control instruction is driving the movable part to extend out of the cavity, the control method proceeds to step S11; in S10, the controller controls the second drive device to drive the movable part to retract into the cavity, and then controls the first drive device to drive the concealing part to the deployed position; and in S11, the controller controls the first drive device to drive the concealing part to the retracted position, and then controls the second drive device to drive the movable part to extend out of the cavity.

Based on the above solution, the smart furniture comprises a plurality of movable parts, and the estimating whether the movable part is in the moving trajectory of the concealing part comprises: recognizing the control instruction, wherein in a case that the control instruction is controlling the concealing part to move towards the deployed position, the control method proceeds to step S20; in a case that the control instruction is controlling the concealing part to move towards the retracted position, the control method proceeds to step S21; in a case that the control instruction is controlling the concealing part to move to the deployed position, the control method proceeds to step S30; in a case that the control instruction is controlling the concealing part to move to the retracted position, the control method proceeds to step S31; and in a case that the control instruction is controlling the concealing part to move towards the retracted position till the specified position, the control method proceeds to step S32; in S20, the controller controls the first drive device to drive the concealing part to move towards the deployed position till the concealing part reaches the deployed position or the control instruction is interrupted; in S21, the controller controls the first drive device to drive the concealing part to move towards the retracted position, and deactivates the first drive device till the concealing part reaches the retracted position, or the concealing part is about to engage the movable part closest to the concealing part in the retracted position, or the control instruction is interrupted; in S30, the controller controls the first drive device to drive the concealing part to the deployed position; in S31, the controller controls the second drive device to drive all movable parts to retract into the cavity, and controls the first drive device to drive the concealing part to the retracted position; and in S32, the moving trajectory of the concealing part is calculated according to the control instruction based on position information of all movable parts detected by the sensor, and the second drive device drives the movable part(s) in the moving trajectory to retract into the cavity.

Based on the above solution, the smart furniture is a kitchen island, the furniture body is a base of the kitchen island, the cavity is a sink disposed on the base, the movable part is a faucet capable of extending out of or retracting into the sink, and the concealing part is a cover plate capable of covering the sink.

Based on the above solution, the first drive device is a push-puller, the push-puller being disposed at a side portion of the sink, the push-puller driving the cover plate to move transversely to conceal or expose the sink.

Based on the above solution, the first drive device is a shaft rotator, the shaft rotator being disposed at a side portion of the sink, the shaft rotator driving the cover plate to flip to conceal or expose the sink.

Based on the above solution, the second drive device is a linear drive device, the linear drive device comprising a housing, a drive, and a linear transmission part disposed in the housing, the faucet being inserted into the housing and in transmission connection with the linear transmission part.

Based on the above solution, the smart furniture is furniture with a storage space, the cavity being a storage cavity, the movable part being a drawer capable of extending out of or or retracting into the storage cavity, the concealing part being a door concealing the drawer.

Based on the above solution, the smart furniture is an electric desk with a concealable device, the movable part is a lamp and/or a receptacle, the concealing part is a movable desktop for concealing the movable part.

The disclosure offers the following benefits:

The disclosure discloses a control method for smart furniture; the smart furniture comprises a movable concealing part and a movable part, the concealing part being driven by the first drive device, the movable part being driven by the second drive device; the control method controls activation of the first drive device and the second drive device to prevent interference between the concealing part and the movable part in the way of their displacement.

After a control instruction is issued to the smart furniture, the receiving box would transmit the control instruction to the controller; the controller processes and analyzes the information of the control instruction to determine a demand of the control information, a part to be moved for executing the instruction, and movement direction of the part. After the demand of the control instruction is known, if the concealing part or the movable part is immediately driven to move by the first drive device or the second drive device, collision between the concealing part and the movable part likely occurs, so that interference therebetween needs to be avoided during their movements. By detecting the concealing part and the movable part via a sensor, current position information of the movable part and the concealing part may be obtained; in conjunction with the demand of controlling the movable part and/or concealing part in the control instruction, the controller may estimate whether interference will occur if the concealing part and the movable part operate according to the current control instruction. The controller controls driving operations of the first drive device and/or the second drive device in conjunction with its own estimation result and the control instruction.

The control method as disclosed herein may realize position switching of the concealing part and the movable part, which satisfies user demands and avoids interference in the switching process.

Furthermore, the estimating, by the controller, whether movement of the movable part or concealing part is to be interfered with based on information from the sensor comprises: recording current position information of the movable part and the concealing part; obtaining, according to the control instruction, a moving trajectory of the movable part or concealing part to a specified position; and estimating whether the movable part is in the moving trajectory of the concealing part or whether the concealing part is in the moving trajectory of the movable part.

By recording the current position information of the concealing part and the movable part and obtaining the position information of the concealing part and the movable part after fulfilling the demand of the control instruction, moving trajectories of the concealing part and the movable part may be obtained, whereby whether interference would occur between the movable part and the concealing part may be known.

Furthermore, the control instruction is driving the concealing part to move towards the deployed position or the retracted position or driving the movable part to move towards a direction of extending out of or retracting into the cavity, the controlling drive direction and drive distance of the first drive device and/or the second drive device comprises: reading the current position information of the movable part and the concealing part; driving, by the first drive device or the second drive device, the concealing part or the movable part, and recording in real time current position information of the concealing part and the movable part; and deactivating the first drive device or the second drive device before occurrence of interference between the concealing part and the movable part or upon interruption of the control instruction.

The purpose of this logic is to adjust positions of the concealing part and the movable part. By confirming the position information of the concealing part and the movable part and controlling the part to which the received control instruction is directed, the position where the concealing part and the movable part are about to interfere may be obtained; while the first drive device or the second drive device is driving the concealing part or moving element to move, the sensor is confirming in real-time current position information of the concealing part and the movable part; when the concealing part and the movable part are about to interfere, if the control instruction is not interrupted, the first drive device or the second drive device would be forcibly deactivated.

Furthermore, in a case that the control instruction is driving the concealing part to the deployed position, the control method proceeds to step S10; and in a case that the control instruction is driving the movable part to extend out of the cavity, the control method proceeds to step S11; in S10, the controller controls the second drive device to drive the movable part to retract into the cavity, and then controls the first drive device to drive the concealing part to the deployed position; in S11, the controller controls the first drive device to drive the concealing part to the retracted position, and then controls the second drive device to drive the movable part to extend out of the cavity.

A purpose of this logic is to adjust the concealing part and the movable part to specified positions; upon receiving the control instruction, position information of the concealing part and the movable part is confirmed, and the concealing part and the movable part are driven sequentially according to the demand information in the control instruction.

Furthermore, the smart furniture comprises a plurality of movable parts, and the estimating whether the movable part is in the moving trajectory of the concealing part comprises: recognizing the control instruction, wherein in a case that the control instruction is controlling the concealing part to move towards the deployed position, the control method proceeds to step S20; in a case that the control instruction is controlling the concealing part to move towards the retracted position, the control method proceeds to step S21; in a case that the control instruction is controlling the concealing part to move to the deployed position, the control method proceeds to step S30; in a case that the control instruction is controlling the concealing part to move to the retracted position, the control method proceeds to step S31; and in a case that the control instruction is controlling the concealing part to move towards the retracted position till the specified position, the control method proceeds to step S32; in S20, the controller controls the first drive device to drive the concealing part to move towards the deployed position till the concealing part reaches the deployed position or the control instruction is interrupted; in S21, the controller controls the first drive device to drive the concealing part to move towards the retracted position, and deactivates the first drive device when the concealing part reaches the retracted position, or when the concealing part is about to engage the movable part closest to the concealing part in the retracted position, or when the control instruction is interrupted; in S30, the controller controls the first drive device to drive the concealing part to the deployed position; in S31, the controller controls the second drive device to drive all movable parts to retract into the cavity, and controls the first drive device to drive the concealing part to the retracted position; and in S32, the moving trajectory of the concealing part is calculated according to the control instruction based on position information of all movable parts detected by the sensor, and the second drive device drives the movable part(s) in the moving trajectory to retract into the cavity.

This logic is to adjust movements of the concealing part and the movable part according to a control instruction in a case that a plurality of movable parts are provided. When the control instruction is adjusting the concealing part to move towards the deployed position, since the movable part in the moving trajectory of the concealing part towards the deployed position is currently in the cavity, movement of the concealing part is not obstructed, so that the concealing part just moves according to the control instruction. When the control instruction is adjusting the concealing part to move to the retracted position, all movable parts in the moving trajectory of the concealing part need to retract into the cavity, and then the concealing part is controlled to move to the retracted position. When the control instruction is adjusting the concealing part to move towards the retracted position till a specified position, since an obstruction to the movable part might be present or not present in the moving trajectory of the concealing part, positions of all movable parts may be detected by the sensor before the concealing part moves, so that which movable part would be in the moving trajectory of the concealing part and interfere with the concealing part may be known, and after the interfering movable parts are driven by the second drive device to retract into the cavity, the concealing part may smoothly move to the specified position.

Furthermore, the smart furniture is a kitchen island, the furniture body is a base of the kitchen island, the cavity is a sink disposed on the base, the movable part is a faucet capable of extending out of or retracting into the sink, and the concealing part is a cover plate capable of covering the sink. The kitchen island is a utensil for an open-plan kitchen, which may serve as a prep table, a temporary table, or a storage cabinet, etc. The sink may be used for cleaning food materials; when the sink lays idle, the cover plate may move transversely to cover the upper end of the sink, thereby concealing the sink in the island; in this way, the usable area of the island on top of the island would increase, facilitating the user in preparing food and dining, thereby enhancing user experience. This structure may even make a larger-area operating platform out of a smaller island.

Furthermore, the second drive device is a linear drive device, the linear drive device comprising a housing, a drive, and a linear transmission part disposed in the housing, the faucet being inserted into the housing and in transmission connection with the linear transmission part. The driver is configured to generate power; the linear transmission part is configured to convert the power generated by the drive to power in the linear direction; the housing of the linear drive device is configured to radially limit the faucet from tilting and rocking in rising/descending of the faucet; and the linear transmission part applies the power in the linear direction against the faucet to implement rising/descending of the faucet.

Furthermore, the smart furniture is furniture with a storage space, the cavity being a storage cavity, the movable part being a drawer capable of extending out of or or retracting into the storage cavity, the concealing part being a door concealing the drawer. The furniture may be furniture with drawers such as a cupboard, a wardrobe, or a wine cabinet, wherein the drawer is configured to store objects; the drawer may be driven by the second drive device to extend out of or retract into the storage cavity to facilitate the user to access the objects therein; the door may conceal the drawer and prevent dusts from entering the drawer.

Furthermore, the smart furniture is an electric desk with a concealable device, the movable part is a lamp and/or a receptacle, and the concealing part is a movable desktop for concealing the movable part. Since the desktop area of the electric desk is limited, the lamp and/or receptable, when laying idle, may be concealed to increase the area of the desktop, and when being used, they may be lifted for lighting purpose or for supplying electrical power to a device.

The above features and advantages of the disclosure will be described in detail through the specific examples with reference to the accompanying drawings.

BRIEF DESCRIPTION OF THE DRAWINGS

Hereinafter, the disclosure will be further illustrated with reference to the accompanying drawings.

7                                                                8

Figure 4:
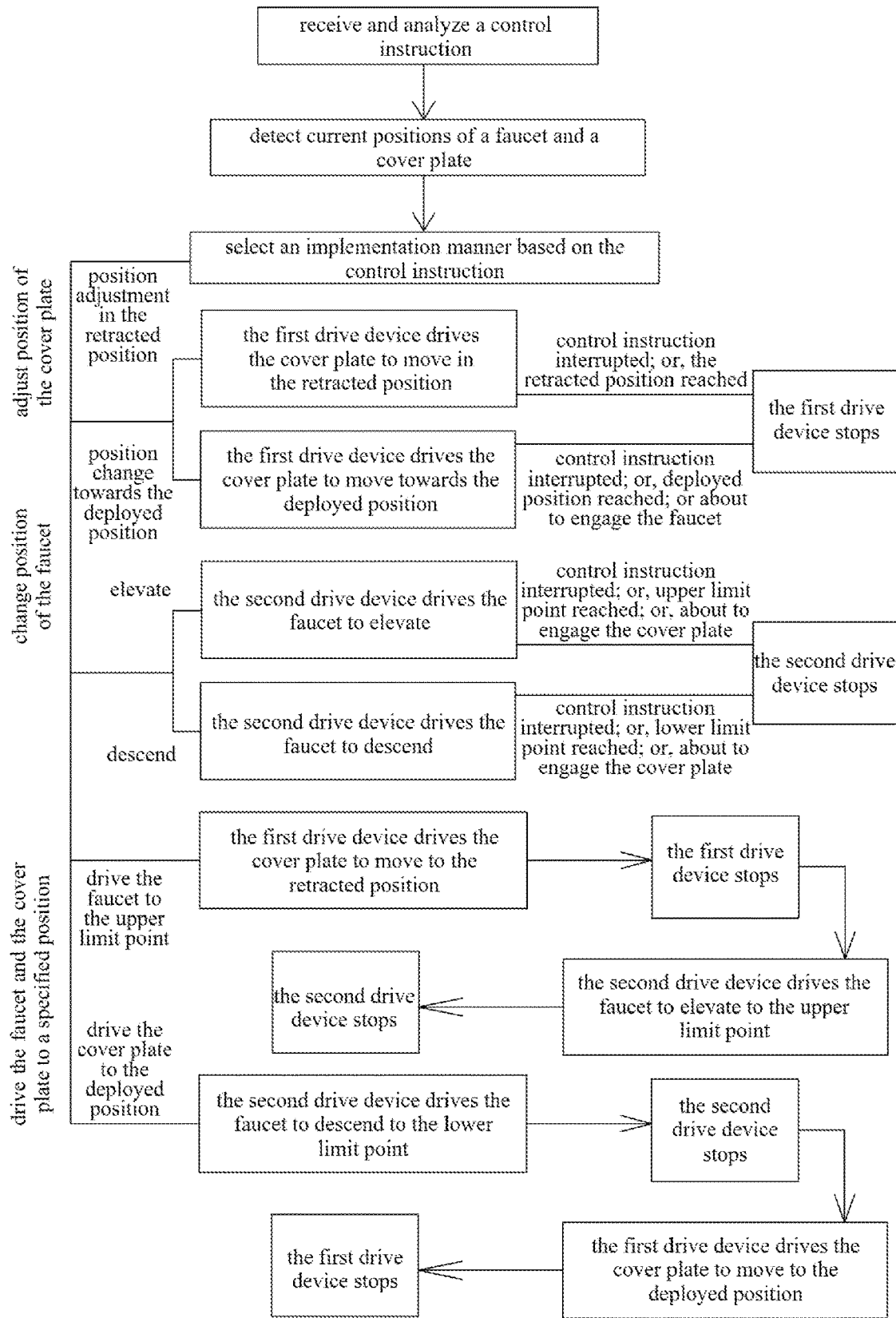
Figure 5:
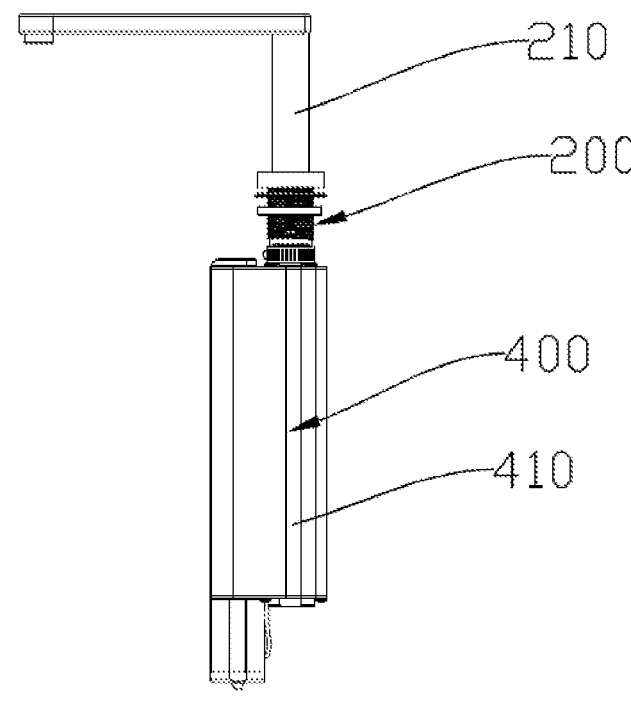
Figure 6:
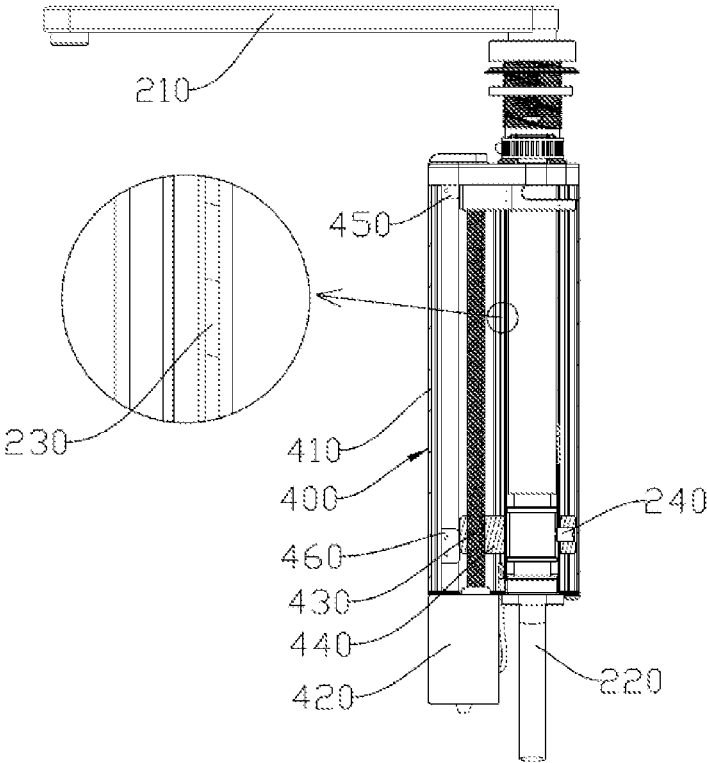
Figure 7:
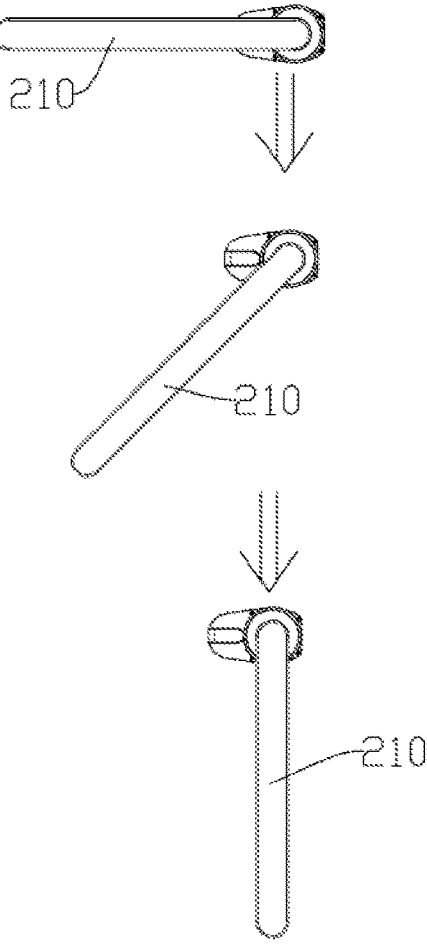
Figure 8:
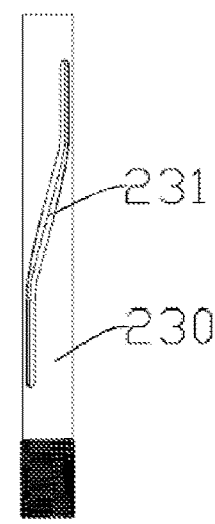
Figure 9:
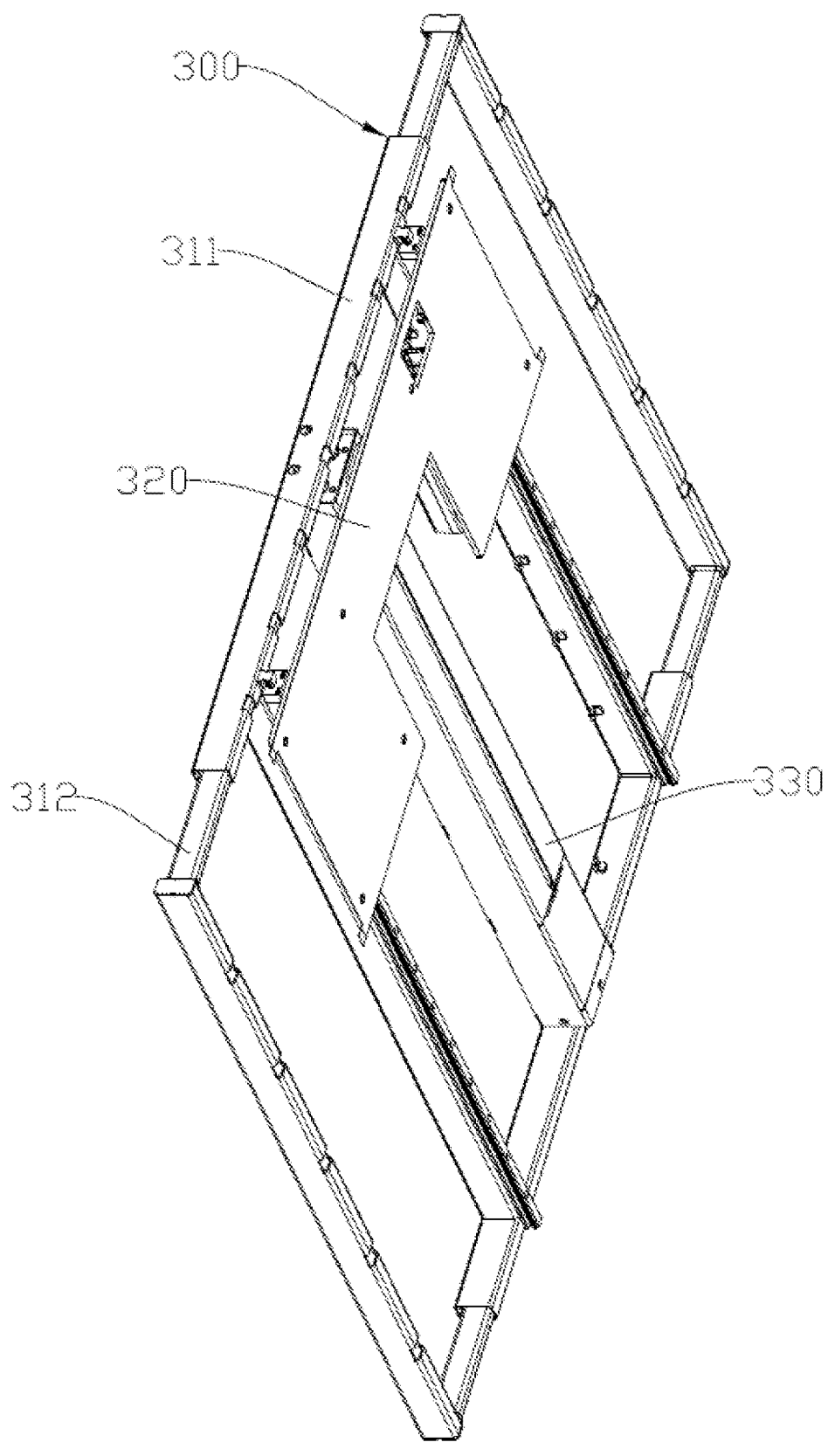
Figure 10:
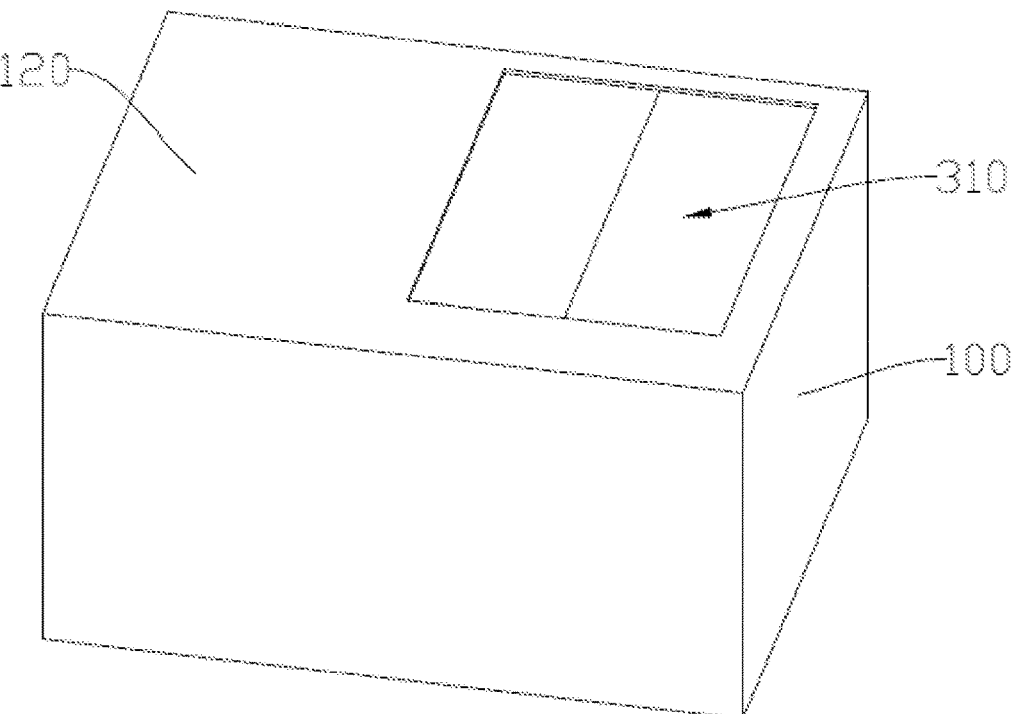
Figure 11:
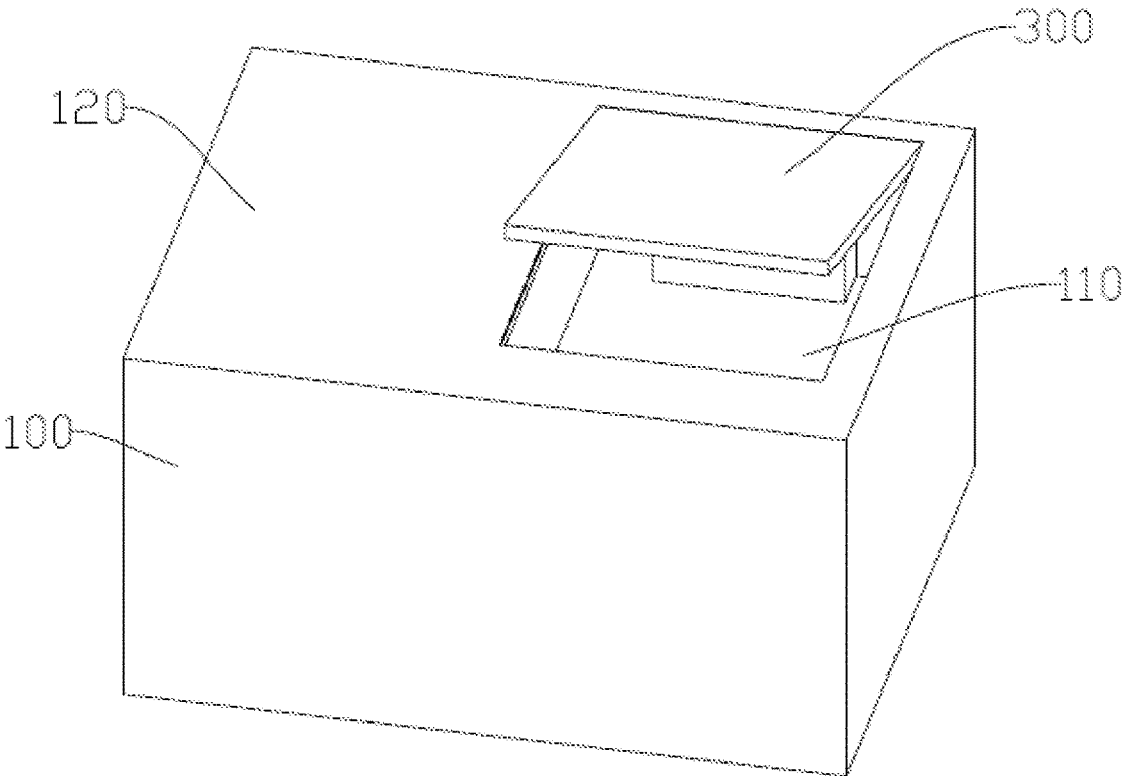
Figure 12:
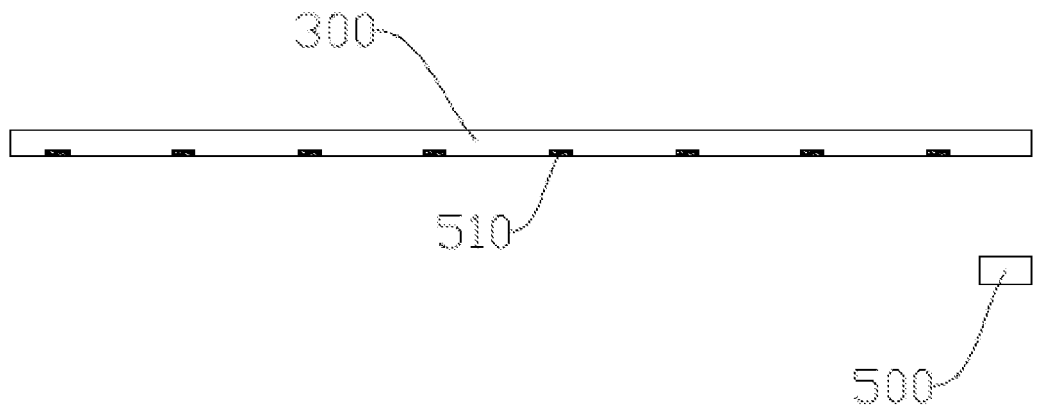
Figure 13:
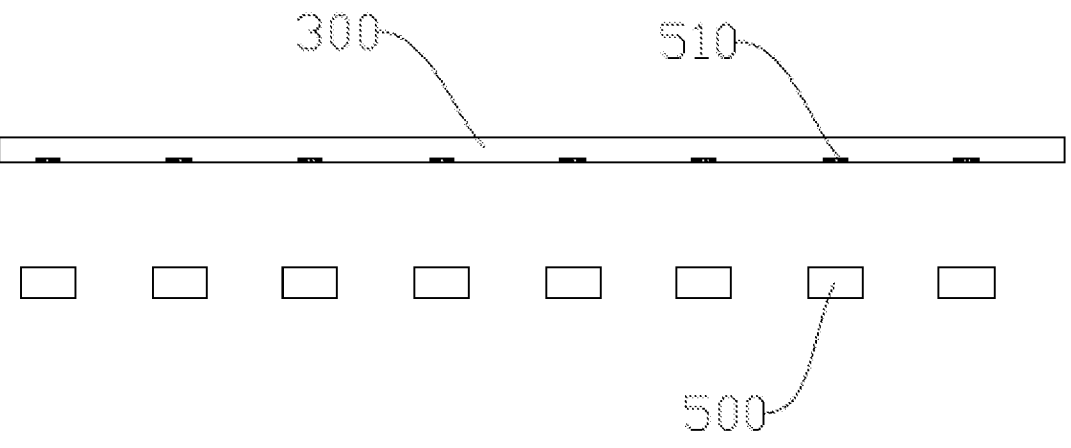

FIG. 4 is a block diagram of a controlling method in some example embodiments of the disclosure;

FIG. 5 is a structural schematic diagram of a faucet and a linear drive device in some example embodiments of the disclosure;

FIG. 6 is a schematic diagram of connection between the faucet and the linear drive device in some example embodiments of the disclosure;

FIG. 7 is an angular change diagram of a fault body during descending of the faucet in some example embodiments of the disclosure;

FIG. 8 is a connection schematic diagram of an outer tube in some example embodiments of the disclosure;

FIG. 9 is a structural schematic diagram of a sliding plate in some example embodiments of the disclosure;

FIG. 10 is a structural schematic diagram of a kitchen island in some example embodiments of the disclosure;

FIG. 11 is another structural schematic diagram of a kitchen island in some example embodiments of the disclosure;

FIG. 12 is a setup diagram of a single Hall sensor in some example embodiments of the disclosure; and FIG. 13 is a setup diagram of a plurality of Hall sensors in some example embodiments of the disclosure.

REFERENCE NUMERALS base 100; sink 110; prep zone 120;

faucet 200; faucet body 210; water inlet tube 220; outer tube 230; guide groove 231; guide post 240;

push-puller 300; cover plate 310; stationary frame 311; movable frame 312; stationary plate 320; linear actuator 330;

linear drive device 400; housing 410; drive 420; screw rod 430; nut 440; upper limiting element 450; lower limiting element 460;

Hall sensor 500; magnet 510.

DETAILED DESCRIPTION OF EMBODIMENTS

Hereinafter, the technical solutions of the disclosure will be explained and illustrated through embodiments with reference to the accompanying drawings. However, the embodiments are only some embodiments of the disclosure, not all of them. Other embodiments obtained by those skilled in the art based on the examples in the embodiments without exercise of inventive work all fall within the protection scope of the disclosure.

The terms such as "exemplary" and "some example embodiments" referred to herein intend to mean "as an example, as an example implementation, or as an illustration"; no embodiments illustrated exemplarily shall be interpreted as preferred to or better than other embodiments. To better illustrate the disclosure, various details will be given in specific embodiments described infra; those skilled in the art shall understand that without some details, the disclosure can also be implemented.

Referring to FIGS. 1 to 4, embodiments of the disclosure disclose smart furniture, the smart furniture comprising a furniture body, a movable part, and a concealing part, the movable part and the concealing part being disposed on the furniture body; a cavity for receiving the movable part is provided on the furniture body; the concealing part's deployed position (position of the cover plate in FIG. 1) for concealing the cavity and retracted position (position of the cover plate in FIG. 2) for exposing the cavity are provided on the furniture body; inside the furniture body are provided a first drive device switching the concealing part between the deployed position and the retracted position and a second drive device driving the movable device to extend out of or retract into the cavity; inside the furniture body is further provided a control system, the control system comprising a sensor configured to detect the movable part and the concealing part, a controller configured to control the first drive device and the second drive device, and a receiving box configured to receive a control instruction, the controller being connected to the sensor to obtain position information of the movable part and the concealing part and being connected to the receiving box to analyze the control instruction.

The first drive device is capable of supplying power to the concealing part to switch between the deployed position and the retracted position; the first drive device may be deactivated at any time so that the concealing part stops at the deployed position, at the retracted position, and at any position between the deployed position and the retracted position; the second drive device is capable of supplying power to the movable part to extend out of and retract into the cavity; movement of the movable part relative to the cavity also has an upper limit point and a lower limit point, and the second drive device is capable of holding the movable part to the upper limit point, to the lower limit point, or to any position between the upper limit point and the lower limit point.

The first drive device and the second drive device may change positions of the concealing part and the movable part so as to satisfy user needs. To ease the description, a kitchen island is taken as an example of the smart furniture. The kitchen island comprises a base 100, a sink 110, a faucet 200, and a cover plate 310, wherein the base 100 refers to the furniture body noted supra, the sink 110 refers to the cavity noted supra, the faucet 200 refers to the movable part noted supra, and the cover plate 310 refers to the concealing part noted supra. The kitchen island is a utensil for an open-plan kitchen, which may serve as a prep table, a temporary table, or a storage cabinet, etc. The sink 110 may be used for cleaning food materials; when the sink 110 lays idle, the cover plate 310 may move transversely to cover the top of the sink 110, thereby concealing the sink 110 inside the island; in this way, the usable area of the island at the top of the island would increase, facilitating the user in preparing food and dining, thereby enhancing user experience. This structure may even make a larger-area operating platform out of a smaller island.

In this example implementation, the deployed position refers to a position of the cover plate 310 where the sink 110 is completely concealed, and the retracted position refers to a position of the cover plate 310 where the sink 110 is exposed on the base 100. When the cover plate 310 is disposed at the deployed position, rising of the faucet 200 would be obstructed by the cover plate 310; when the faucet 200 extends out of the sink 110, movement of the cover plate 310 towards the deployed position would be obstructed by the faucet 200. The control method for smart furniture provided herein intends to overcome movement interference between the cover plate 310 and the faucet 200.

A control method for smart furniture comprises:

analyzing, by the controller after the receiving box receives a control instruction directed to the faucet 200 or the cover plate 310, the control instruction to determine a movement direction of the faucet 200 or the cover plate 310;

obtaining, by the sensor, current positions of the faucet 200 and the cover plate 310, and estimating, by the controller, whether movement of the faucet 200 or movement of the cover plate 310 is to be interfered with based on information from the sensor; and controlling, based on estimated direction and interference estimation in conjunction with the control instruction, drive direction and drive distance of the first drive device and/or the second drive device.

After the control instruction is issued to the smart furniture, the receiving box transmits the control instruction to the controller; and the controller processes and analyzes the information in the control instruction to determine a demand of the control instruction, a part to be moved to implement the instruction, and movement direction of the part. Once the demand of the control instruction is known, if the faucet 200 or the cover plate 310 were immediately driven to move by the first drive device or the second drive device, the faucet 200 and the cover plate 310 would collide; therefore, it is needed to avoid potential movement interference therebetween. By detecting the faucet 200 and the cover plate 310 via the sensor, current position information of the faucet 200 and cover plate 310 may be obtained; in conjunction with the control demand on the faucet 200 and/or cover plate 310 in the control instruction, the controller may estimate whether movements of the faucet 200 and the cover plate 310 according to the current control instruction will interfere. The controller controls, based on its own estimation result and control instruction, driving of the first drive device and/or the second drive device.

In the control method, the estimating, by the controller, whether movement of the faucet 200 or movement of cover plate 310 is to be interfered with based on information from the sensor comprises:

recording current position information of the faucet 200 and the cover plate 310;

obtaining, according to the control instruction, a moving trajectory of the faucet 200 or the cover plate 310 moving to a specified position; and estimating whether the faucet 200 is about to appear in the moving trajectory of the cover plate 310 or whether the cover plate 310 is about to appear in the moving trajectory of the faucet 200.

By recording current position information of the faucet 200 and the cover plate 310 and obtaining, according to the control instruction, position information of the faucet 200 and the cover plate 310 after fulfilling the demand in the control instruction, the moving trajectory of the faucet 200 and the moving trajectory of the cover plate 310 may be obtained, whereby whether the faucet 200 and the cover plate 310 are likely to interfere with each other may be known.

In the control method described supra, controlling of the drive direction and drive distance of the first drive device and/or the second drive device needs to be specifically implemented in conjunction with the control instruction. The control instruction is inputted by the user; the island is configured with a hand controller, or a remote controller, or an operating interface directly installed on the island, where control buttons are provided, so that different control instructions may be inputted by pressing down different control buttons.

The control buttons include: a first forward button, a first back button, a second forward button, a second back button, a retract button, and a deploy button.

Specifically, the first forward button is configured to control the cover plate 310 to move in the retracted position; the first back button is configured to control the cover plate 310 to move towards the deployed position; the second forward button is configured to control the faucet 200 to extend out of the sink 110; the second back button is configured to control the faucet 200 to retract into the sink 110; the retract button is configured to activate movement of the cover plate 310 to a retracted position and activate retraction of the faucet 200 to the sink 110 till the lower limit point; and the deploy button is configured to activate movement of the cover plate 310 to the deployed position and activate extension of the faucet 200 out of the sink 110 till the upper limit point.

The six buttons noted supra correspond to two kinds of control instructions; when one of the first forward button, the first back button, the second forward button, and the second back button is depressed, the control instruction is driving the cover plate 310 to move towards the deployed position or retracted position or driving the faucet 200 to move towards a direction of extending out of or retracting into the sink 110; and when the retract button or the deploy button is depressed, the control instruction is driving the cover plate 310 to switch to the deployed position or drive the faucet 200 to extend out of the sink 110.

In a case that the control instruction is driving the cover plate 310 to move towards the deployed position or retracted position or driving the faucet 200 to move towards a direction of extending out of or retracting into the sink 110, the controlling drive direction and drive distance of the first drive device and/or the second drive device comprises:

reading current position information of the faucet 200 and the cover plate 310;

driving the cover plate 310 or the faucet 200 via the first drive device or the second drive device, and recording the current position information of the cover plate 310 and the faucet 200 in real time; and deactivating the first drive device or the second drive device before the faucet 200 and the cover plate 310 interfere with each other or when the control instruction is interrupted.

The control method described supra can interrupt the control instruction before interference between the faucet 200 and the cover plate 310. Exemplarily, the control instruction is generated by depressing the first forward button or the first back button; after content of the control instruction is determined, positions of the faucet 200 and the cover plate 310 are confirmed via the sensor; afterwards, the first drive device is activated to drive the cover plate 310 to move towards a user-desired direction; once the first forward button or the first back button is released, the control instruction is interrupted, the first drive device is deactivated, and the cover plate 310 stops; when the cover plate 310 moves to the deployed position or the retracted position, the cover plate 310 cannot move further and the first drive device is also deactivated immediately, thereby avoiding damages to the first drive device; when the cover plate 310 moves to a position about to collide with the faucet 200, the first drive device is deactivated immediately. If the faucet 200 and the cover plate 310 are located at positions about to interfere when the control instruction is issued, the control instruction generated from depressing the first forward button is disabled.

If the control instruction is driving the cover plate 310 to switch to the deployed position, the controlling drive direction and drive distance of the first drive device and/or the second drive device comprises: S10, controlling, by the controller, the second drive device to drive the movable part to retract into the cavity, and then, controlling the first drive device to drive the concealing part to the deployed position.

If the control instruction is driving the faucet 200 to extend out of the sink 110, the controlling drive direction and drive distance of the first drive device and/or the second drive device comprises: controlling, by the controller, the first drive device to drive the concealing part to the retracted position, and then controlling the second drive device to drive the movable part to extend out of the cavity.

A purpose of this logic is to adjust the concealing part and the movable part to specified positions; after receiving the control instruction, position information of the concealing part and the movable part is confirmed; and according to the information instructed in the control instruction, the concealing part and the movable part are driven sequentially.

The specific control process is descried as follows:

Step 1: receiving the control instruction and analyzing the control instruction;

Step 2: detecting, by the sensor, position information of the faucet 200 and the cover plate 310;

Step 3: selecting between different implementation manners according to the control instruction, wherein in a case that the control instruction is controlling the cover plate 310 to move towards the deployed position, the control process proceeds to step 4; in a case that the control instruction is controlling the cover plate 310 towards the retracted position, the control process proceeds to step 5; in a case that the control instruction is controlling the faucet 200 to rise, the control process proceeds to step 6; in a case that the control instruction is controlling the faucet 200 to descend, the control process proceeds to step 7; in a case that the control instruction is controlling the cover plate 310 to switch to the retracted position, the control process proceeds to step 8; and in a case that the control instruction is controlling the faucet 200 to rise to the upper limit point, the control process proceeds to step 9;

Step 4: activating the first drive device to drive the cover plate 310 to move towards the retracted position till the control instruction is interrupted or the cover plate 310 moves to the retracted position;

Step 5: activating the first drive device to drive the cover plate 310 to move towards the deployed position, wherein the sensor detects in real time positions of the faucet 200 and the cover plate 310, and deactivating the first drive device when the control instruction is interrupted, or when the cover plate 310 moves to the retracted position, or when the cover plate 310 is about to interfere with the faucet 200;

Step 6: activating the second drive device to drive the faucet 200 to rise, wherein the sensor detects in real time positions of the faucet 200 and the cover plate 310, and deactivating the second drive device when the control instruction is interrupted, or when the faucet 200 rises to the upper limit point, or when the faucet 200 is about to interfere with the cover plate 310;

Step 7: activating the second drive device to drive the faucet 200 to descend, wherein the sensor detects in real time positions of the faucet 200 and the cover plate 310, and deactivating the second drive device when the control instruction is interrupted, or when the faucet 200 descends to the lower limit point, or when the faucet 200 is about to interfere with the cover plate 310;

Step 8: activating the second drive device to drive the faucet 200 to descend till the lower limit point, then deactivating the second drive device and meanwhile activating the first drive device to drive the cover plate 310 to move to the retracted position, and then deactivating the first drive device;

Step 9: activating the first drive device to drive the cover plate 310 to move to the deployed position, then deactivating the first drive device and activating the second drive device to drive the faucet 200 to rise to the upper limit point, and then deactivating the second drive device.

In the above solution, when the faucet 200 and the cover plate 310 are at positions about to interfere, relevant control instructions would be disabled, i.e., these construction instructions are disabled to avoid damages to the equipment. Another example embodiment of the disclosure provides the following features different from the embodiments noted supra:

the sensor is configured to detect whether the faucet is located at the lower limit point and whether the cover plate is located at the retracted position; in a case of detecting that the faucet is located at the lower limit point, the cover plate may be driven by the first drive device to switch from the retracted position to the deployed position; and in a case that the faucet is not located at the lower limit point, the first drive device is in a locked state;

in a case of detecting that the cover plate is located at the retracted position, the faucet may be driven by the second drive device to rise from the lower limit point to the upper limit point, or descend from the upper limit point to the lower limit point; and in a case that the cover plate is not located at the retracted position, the second drive device is in a locked state.

Figures 1, 2:
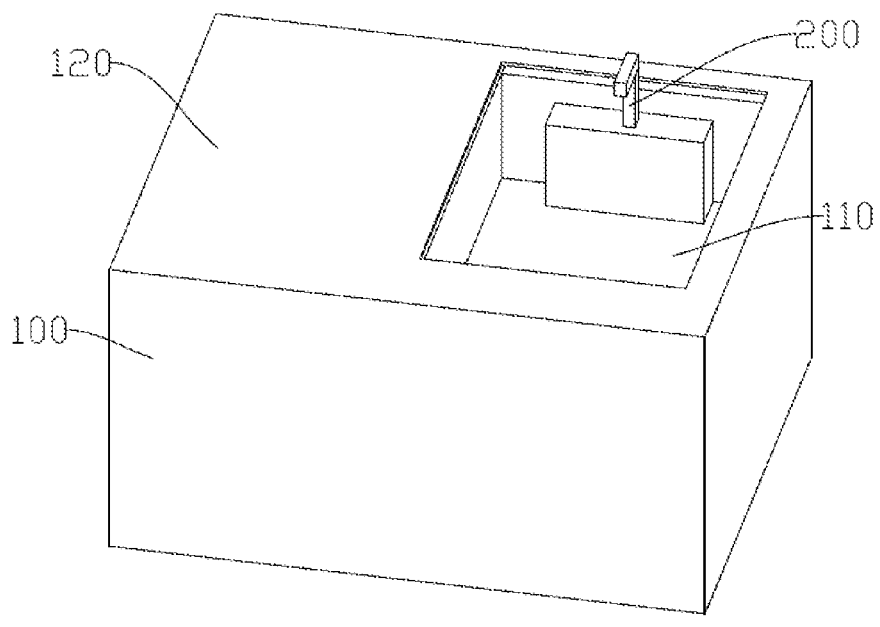
FIG. 1 is a structural schematic diagram of a kitchen island with a sink exposed in some example embodiments of the disclosure.
FIG. 2 is a structural schematic diagram of the kitchen island with the sink concealed in some example embodiments of the disclosure.
Figure 3:
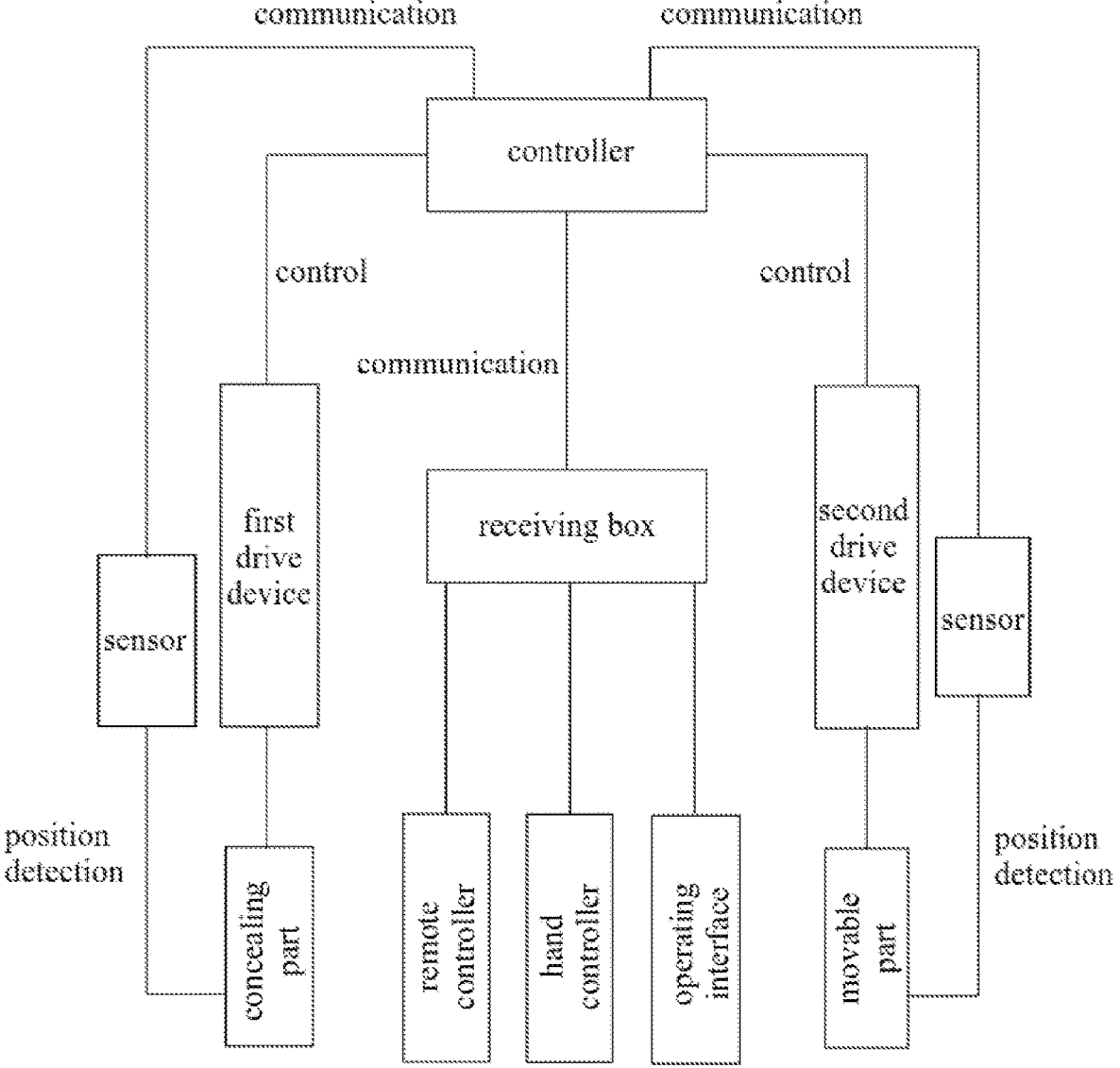
FIG. 3 is a structural schematic diagram of a control system in some example embodiments of the disclosure.

Referring to FIGS. 1, 2 and 9, in one example embodiment of the disclosure, a structure of the first drive device is specifically illustrated infra:

the kitchen island has a prep zone 120 at a side portion of the sink 110; the prep zone 120 is a platform; a push-puller 300 is disposed on the base 100 under the prep zone 120 and located at a side portion of the sink 110; the push-puller 300 comprises a stationary plate 320 fixed on the base 100; the cover plate 310 is slidingly mounted on the stationary plate 320; a linear actuator 330 configured to drive the cover plate 310 to move transversely is provided on the stationary plate 320; the push-puller 300 is securely mounted on the base 100 via the stationary plate 320; the linear actuator 330 can output a linear, reversed, reciprocal power so as to control the stationary plate 320 to move transversely and reciprocally, thereby implementing the island's functions of concealing and exposing the sink 110.

The cover plate 310 comprises a stationary frame 311 and a movable frame 312, the stationary frame 311 being connected to the stationary plate 320, the movable frame 312 being mounted on the stationary frame 311 and slidable towards lateral sides of the stationary frame 311 so as to change the width of the cover plate 310, and after the movable frame 312 is fixed, its position on the stationary frame 311 is also secured, so that the width of the cover plate 310 does not change during transverse movement of the cover plate 310.

Referring to FIGS. 1, 2, and 5-8, in one example embodiment of the disclosure, the faucet 200 comprises a faucet body 210 exposed in the sink 110, the faucet body 210 being inserted into the base 100, a water inlet tube 220 connected to the faucet body 210 being provided inside the base 100, the water inlet tube 220 being connected to the second drive device, the second drive device driving the water inlet tube 220 to rise/descend so as to bring the faucet body 210 to rise/descend.

The second drive device refers to a linear drive device 400; the linear drive device 400 comprises a housing 410, a drive 420, and a linear transmission part disposed in the housing 410; the faucet body 210 is inserted into the housing 410; the water inlet tube 220 enters the inside of the housing 410 from the bottom of the housing 410 and is connected to the faucet body 210, the water inlet tube 220 being further connected to the linear transmission part. The drive 420 refers to a motor for generating a rotating power; the linear transmission part is connected to the drive 420 and configured to convert the power generated by the drive 420 into a linear power to drive the water inlet tube 220 to bring the faucet body 210 to rise/descend. The housing 410 may not only accommodate the concealed faucet body 210, but also may limit the faucet body 210 radially, avoiding tilting and rocking of the faucet 200 during up or down movement.

The faucet 200 is further provided thereon with a steering element, the steering element being configured to drive the faucet body 210 to rotate while moving up or down.

The steering element enables the faucet 200 to rotate while moving up or down, so that when the up/down movement stops, the faucet body 210 has turned by a certain angle relative to the previous state, which may avoid objects in the sink 110, thereby improving aesthetic appearance and enhancing user experience. FIG. 7 illustrates angle variation of the faucet body 210 during downward movement of the faucet 200; the angle variation of the faucet body 210 during upward movement of the faucet 200 is just opposite.

Specifically, the steering element comprises an outer tube 230 sleeved outside the water inlet tube 220; the outer tube 230, which is secured in the housing 410 of the linear drive device 400, maintains stationary as the faucet 200 moves up or down. A through guide groove 231 is provided on the outer tube 230; a guide post 240 connected, through the guide groove 231, to the linear transmission part is provided on the water inlet tube 220. The linear transmission part pushes the guide post 240 to drive the faucet 200 to move up or down. As the faucet body 210 and the water inlet tube 220 are moving up/down, the guide post 240 keeps moving synchronously with the water inlet tube 220 and can be held in the guide groove 231; moreover, the edge of the guide groove 231 can push the guide post 240, so that the guide post 240 can move along a trajectory of the guide groove 231, resulting in positional variation in the circumferential direction, whereby the water inlet tube 220 and the faucet body 210 are driven to rotate. By setting the trajectory of the guide groove 231, angles and timings of rotation of the water inlet tube 220 and the faucet body 210 become variable so as to be adjusted dependent on actual user needs and specific equipment structures.

While the faucet 200 is descending, the cover plate 300 is not in the way of the faucet body 210's rotating towards the deployed position, so that no interference is encountered during the downward movement. If the cover plates are provided at both sides of the faucet, interference between the faucet body and the cover plates needs to be taken into account in the way of downward movement of the faucet. Since the rotating angle of the faucet body is associated with its height, the real-time angle of the faucet body may be estimated by the sensor detecting up/down movement distance of the faucet, whereby interference estimation is made.

Referring to FIGS. 5 to 8, based on the above solution, in another example embodiment, the linear transmission part comprises a screw rod 430 and a nut 440 in threaded-fit with the screw rod 430, the water inlet tube 220 being connected to the nut 440.

After the drive 420 drives the screw rod 430 to rotate, the nut 440 can move axially along the screw rod 430 and brings the faucet 200 to rise/descend; the transmission manner via the screw rod 430 and the nut 440 enables the faucet 200 to maintain a stable rising/descending speed, so that the faucet 200, which does not rise/descend too fast, will not collide with another object or a body part of the user. In addition, the faucet 200 may also limit rotation of the nut 440, so that the nut 440 will not be driven by the screw rod 430 to rotate circumferentially, thereby realizing linear movement of the nut 440.

The linear drive device 400 further comprises a limiting device configured to limit a travel of the nut 440. The limiting device can limit positions of up/down movement of the nut 440, thereby limiting the travel of the nut 440, i.e., the travel of the faucet 200 (upper limit point and lower limit point of the faucet 200) is also limited, which may prevent a circumstance that the drive 420 continues operation so as to be damaged after the faucet 200 moves up/down to an extreme position.

The limiting device comprises an upper limiting element 450 and a lower limiting element 460 disposed in the housing 410, and the drive 420 is deactivated when the nut 440 engages the upper limiting element 450 or the lower limiting element 460.

The upper limiting element 450 and the lower limiting element 460 are travel switches. When the nut 440 moves to the upper limiting element 450 or the lower limiting element 460, the switch function is triggered to directly deactivate the drive 420, immediately suspending the up/down movement of the faucet 200. Since there exists a certain distance between the upper limiting element 450 and the top wall of the housing 410 and a certain distance between the lower limiting element 460 and the bottom wall of the housing 410, the nut 440 will gradually approach to the upper limiting element 450 or lower limiting element 460 while moving up/down. When the nut 440 reaches a corresponding limit point, which indicates the faucet 200 already reaches an appropriate position, since the deactivated drive 420 now still has certain inertia to continuously output certain power, the faucet 200 driven by the power may move up/down by a certain distance, so that a certain displacement margin is allowed for the faucet 200 after deactivation of the drive 420 without affecting the overall operation of the equipment. Of course, the power outputted from the deactivated drive 420 might not suffice to drive continued movement of the faucet 200, so that the faucet 200 can stop immediately; in this way, the drive 420 will not be subjected to abrupt power increase and thus will not be easily damaged, thereby having an extended service life.

Different from the example embodiments noted supra, in another example embodiment of the disclosure, the limiting device comprises a current detector configured to detect electrical current of the drive to determine whether the nut has reached the extreme position.

After reaching the extreme position, the nut cannot move further but will apply a reaction force against the screw rod; to overcome the reaction force, the drive will increase its own power so that the magnitude of current will increase; if the current detector detects that the originally stable current of the drive increases abruptly, it may be known that the faucet is in place; this may keep the positional points for up/down movement of the faucet unchanged, and thus the limit points do not change; in this way, the faucet descending in place cannot contact the cover plate.

Referring to FIGS. 12 and 13, in one example embodiment of the disclosure, the sensor is specifically a Hall sensor 500.

Two sensors are provided to detect positions of the cover plate 310 and the faucet 200, respectively. The cover plate 310 and the faucet 200 are provided thereon with a magnet 510, so that the Hall sensor 500 may estimate the distance between the magnet 510 and the Hall sensor 500 by sensing the magnetic field of the magnet 510. By processing the signal from the Hall sensor 500 in conjunction with the control instruction (the control instruction instructs movement directions of the cover plate 310 and the faucet 200), the current positions of the cover plate 310 and the faucet 200 may be obtained. As the cover plate 310 has a long displacement change, a plurality of magnets 510 are provided therebetween. The Hall sensor 500 determines, by detecting the magnetic field change, the number of magnets 510 passing through the Hall sensor 500 and the magnet 510 to which the current magnetic field belongs; in this way, the current position of the cover plate 310 may be determined by detecting the position of current magnet 510 and the length corresponding to the number of magnets 510 traversed. Of course, a plurality of Hall sensors 500 may be set in one-to-one correspondence to the plurality of magnets 510, so that the current position of the cover plate 310 may be obtained by detecting and analyzing the signals from the plurality of Hall sensors 500.

Optionally, the sensor may also be a distance-measuring sensor, e.g., an ultrasonic distance sensor, a laser distance sensor, an infrared distance sensor, and mmWave radar sensor.

In an example embodiment of the disclosure, referring to FIG. 10, the cover plate 310 comprises a first plate body and a second plate body, the first plate body and the second plate body being disposed at two sides of the sink 110, respectively, so that when the first plate body engages the second plate body, the sink 110 is concealed in the island. With this design, the size of the first drive device may be reduced so as to be applicable to a smaller island. In operation, the sensor needs to simultaneously sense the positions of the first plate body and the second plate body.

In addition, referring to FIG. 11, movement of the cover plate 310 may also be a flip motion. The first drive device is a shaft rotator configurable to drive the cover plate 310 to flip upside down relative to the cover plate 310. The turn radius of the cover plate 310 is invariable, so that position information of the cover plate 310 may be obtained by the sensor sensing the turn angle of the cover plate 310 and the included angle between the cover plate 310 and the horizontal plane, and the controller may also analyze the information to determine whether the faucet 200 is in the way of flipping trajectory of the cover plate 310. Of course, the cover plate may also be split into a first plate body and a second plate body, so that two sets of shaft rotators may be provided on the island to control flipping of the first plate body and the second plate body, respectively.

The embodiments noted supra describe an island. Of course, the solution of the disclosure may also be applied to other kind of smart furniture. In an example embodiment of the disclosure, the smart furniture comprises a plurality of movable parts.

Estimating whether the movable part is about to appear in the moving trajectory of the concealing part comprises: recognizing the control instruction; wherein in a case that the control instruction is controlling the concealing part to move towards the deployed position, the method proceeds to step S20; in a case that the control instruction is controlling the concealing part to move towards the retracted position, the method proceeds to step S21; in a case that the control instruction is controlling the concealing part to move to the deployed position, the method proceeds to step S30; in a case that the control instruction is controlling the concealing part to move to the retracted position, the method proceeds to step S31; in a case that the control instruction is controlling the concealing part to move towards the retracted position till a specified position, the method proceeds to step S32;

in S20, the controller controls the first drive device to drive the concealing part to move towards the deployed position till the concealing part reaches the deployed position or the control instruction is interrupted;

in S21, the controller controls the first drive device to drive the concealing part to move towards the retracted position, and deactivates the first drive device when the concealing part reaches the retracted position, or when the concealing part is about to engage the movable part closest to the concealing part in the direction towards the retracted position, or the control instruction is interrupted;

in S30, the controller controls the first drive device to drive the concealing part to move to the deployed position;

in S31, the controller controls the second drive device to drive all movable parts to retract into the cavity, and then controls the first drive device to drive the concealing part to move to the retracted position;

in S32, the moving trajectory of the concealing part is calculated based on position information of all movable parts detected by the sensor according to the control instruction, and the second drive device drives the movable part(s) in the moving trajectory to retract into the cavity.

This logic is to adjust, in a case that a plurality of movable parts are provided, movements of the concealing part and the movable parts based on a control instruction; when the control instruction is adjusting the concealing part to move towards the deployed position, since the movable parts in the moving trajectory of the concealing part towards the deployed position are currently in the cavity, movement of the concealing part will not be obstructed, so that the concealing part just moves according to the control instruction; in a case that the control instruction is adjusting the concealing part to move to the retracted position, all movable parts in the moving trajectory of the concealing part need to retract into the cavity, and then the concealing part is controlled to move to the retracted position; in a case that the control instruction is adjusting the concealing part to move towards the retracted position till a specified position, since a movable part might or might not appear in the moving trajectory of the concealing part, positions of all movable parts may be detected by the sensor before the concealing part moves, whereby which movable part(s) are in the moving trajectory of the concealing part and will interfere with the concealing part may be known, and after the movable part(s) are driven by the second drive device to retract into the cavity, the concealing part may smoothly move to the specified position.

The disclosure actually discloses a dual-linear drive apparatus and a method of controlling the dual-linear drive apparatus. The disclosure may not only be applied to an island, but also may be applied to other kinds of furniture, e.g., furniture with a storage space, which may be furniture with drawers such as a cupboard, a wardrobe, or a wine cabinet, wherein the cavity refers to a storage cavity, the movable part refers to a drawer which can extend out of or retract into the storage cavity, the concealing part refers to a door that may conceal the drawer and prevent dusts from getting into the drawer, where a plurality of drawers may be provided. Or, the smart furniture may be an electric desk with a concealable device, wherein the movable part refers to a lamp and/or a receptacle, and the concealing part refers to a movable desktop for concealing the movable part; the lamp and the receptacle, when being laid idle, may be stored inside the desk body so as to increase a usable area of the desktop, and when being used, may be lifted for lighting purpose or supplying electrical power to a device. Or, the smart furniture is a dining table with a secondary desktop under the desktop, so that in a need of increasing the area of the desktop, the desktop may be split towards both sides while the secondary desktop is lifted from the middle, whereby the secondary desktop is spliced with the desktop to form a larger dining desk.

What have been described above are only example embodiments of the present disclosure; however, the protection scope of the present disclosure is not limited thereto. A person skilled in the art should understand that the disclosure includes, but is not limited to, the contents described in the drawings and the embodiments. Any modifications without departing from the functions and structural principles of the disclosure will be included within the scope of the claims.

We claim:

1. A control method for smart furniture, wherein the smart furniture comprises a furniture body, a movable part and a concealing part, the movable part and the concealing part being disposed on the furniture body; a cavity for receiving the movable part is provided on the furniture body; the concealing part's deployed position for concealing the cavity and retracted position for exposing the cavity are provided on the furniture body; inside the furniture body are provided a first drive device for switching the concealing part between the deployed position and the retracted position, and a second drive device for driving the movable part to extend out of or retract into the cavity; inside the furniture body are further provided a sensor for detecting positions of the movable part and the concealing part, a controller for controlling the first drive device and the second drive device, and a receiving box for receiving a control instruction; the controller is connected to the sensor to obtain position information of the movable part and the concealing part, and connected to the receiving box to analyze the control instruction;

the control method comprises:

analyzing, by the controller, after the receiving box receives a control instruction directed to the movable part or the concealing part, the control instruction to estimate moving direction of the movable part or the concealing part;

obtaining, by the sensor, current positions of the movable part and the concealing part, and estimating, by the controller, whether movement of the movable part or the concealing part is to be interfered with based on information from the sensor; and controlling, based on estimated direction and interference estimation in conjunction with the control instruction, drive direction and drive distance of the first drive device and/or the second drive device;

wherein the estimating, by the controller, whether movement of the movable part or concealing part is to be interfered with based on information from the sensor comprises: recording current position information of the movable part and the concealing part; obtaining, according to the control instruction, a moving trajectory of the movable part or the concealing part to a specified position; and estimating whether the movable part is in the moving trajectory of the concealing part or whether the concealing part is in the moving trajectory of the movable part.

2. The control method for smart furniture according to claim 1, wherein the control instruction is driving the concealing part to move towards the deployed position or the retracted position or driving the movable part to move towards a direction of extending out of or retracting into the cavity, and the controlling drive direction and drive distance of the first drive device and/or the second drive device comprises:

reading the current position information of the movable part and the concealing part;

driving, by the first drive device or the second drive device, the concealing part or the movable part, and recording in real time current position information of the concealing part and the movable part; and deactivating the first drive device or the second drive device before occurrence of interference between the concealing part and the movable part or upon interruption of the control instruction.

3. The control method for smart furniture according to claim 1, wherein in a case that the control instruction is driving the concealing part to the deployed position, the control method proceeds to step S10; and in a case that the control instruction is driving the movable part to extend out of the cavity, the control method proceeds to step S11;

in S10, the controller controls the second drive device to drive the movable part to retract into the cavity, and then controls the first drive device to drive the concealing part to the deployed position;

in S11, the controller controls the first drive device to drive the concealing part to the stored position, and then controls the second drive device to drive the movable part to extend out of the cavity.

4. The control method for smart furniture according to claim 1, wherein the smart furniture comprises a plurality of movable parts, and the estimating whether the movable part is in the moving trajectory of the concealing part comprises:

recognizing the control instruction, wherein in a case that the control instruction is controlling the concealing part to move towards the deployed position, the control method proceeds to step S20; in a case that the control instruction is controlling the concealing part to move towards the stored position, the control method proceeds to step S21; in a case that the control instruction is controlling the concealing part to move to the deployed position, the control method proceeds to step S30; in a case that the control instruction is controlling the concealing part to move to the stored position, the control method proceeds to step S31; and in a case that the control instruction is controlling the concealing part to move towards the stored position till the specified position, the control method proceeds to step S32;

in S20, the controller controls the first drive device to drive the concealing part to move towards the deployed position till the concealing part reaches the deployed position or the control instruction stops;

in S21, the controller controls the first drive device to drive the concealing part to move towards the stored position till the concealing part reaches the stored position, or deactivates the first drive device when the concealing part is about to access the movable part closest to the concealing part towards the stored position, or stops the control instruction;

in S30, the controller controls the first drive device to drive the concealing part to the deployed position;

in S31, the controller controls the second drive device to drive all movable parts to retract into the cavity, and controls the first drive device to drive the concealing part to the stored position; and in S32, the moving trajectory of the concealing part is calculated based on position information of all movable parts detected by the sensor according to the control instruction, and the second drive device drives a movable part in the moving trajectory to retract into the cavity.

5. The control method for smart furniture according to claim 1, wherein the smart furniture is a kitchen island, the furniture body is a base of the kitchen island, the cavity is a sink disposed on the base, the movable part is a faucet capable of extending out of or retracting into the sink, and the concealing part is a cover plate capable of covering the sink.

6. The control method for smart furniture according to claim 5, wherein the first drive device is a push-puller, the push-puller being disposed at a side portion of the sink, the push-puller driving the cover plate to move transversely to conceal or expose the sink.

7. The control method for smart furniture according to claim 5, wherein the first drive device is a shaft rotator, the shaft rotator being disposed at a side portion of the sink, the shaft rotator driving the cover plate to flip to conceal or expose the sink.

8. The control method for smart furniture according to claim 5, wherein the second drive device is a linear drive device, the linear drive device comprising a housing, a drive, and a linear transmission part disposed in the housing, the faucet being inserted into the housing and in transmission connection with the linear transmission part.

9. The control method for smart furniture according to claim 1, wherein the smart furniture is furniture with a storage space, the cavity being a storage cavity, the movable part being a drawer capable of extending out of or retracting into the storage cavity, the concealing part being a door concealing the drawer.

10. The control method for smart furniture according to claim 1, wherein the smart furniture is an electric desk with a concealable device, the movable part is a lamp and/or a receptacle, and the concealing part is a movable desktop for concealing the movable part.

* * * * *